US008306097B2

(12) United States Patent
De Lind Van Wijngaarden et al.

(10) Patent No.: US 8,306,097 B2
(45) Date of Patent: Nov. 6, 2012

(54) SIGNAL SUSPENSION AND RESUMPTION IN DSL SYSTEMS

(75) Inventors: Adriaan J. De Lind Van Wijngaarden, New Providence, NJ (US); Jochen Maes, Veerle (BE); Carl Jeremy Nuzman, Union, NJ (US); Danny Van Bruyssel, Temse (BE)

(73) Assignee: Alcatel Lucent, Paris (FR)

( * ) Notice: Subject to any disclaimer, the term of this patent is extended or adjusted under 35 U.S.C. 154(b) by 1175 days.

(21) Appl. No.: 12/157,461

(22) Filed: Jun. 10, 2008

(65) Prior Publication Data

US 2009/0304056 A1    Dec. 10, 2009

Related U.S. Application Data

(60) Provisional application No. 61/130,979, filed on Jun. 4, 2008.

(51) Int. Cl.
H04B 1/38      (2006.01)
H04B 3/46      (2006.01)
H04B 11/00     (2006.01)
H04L 23/00     (2006.01)

(52) U.S. Cl. ...... 375/222; 375/224; 375/377; 379/93.01
(58) Field of Classification Search ............ 375/260, 375/219, 222, 224, 227, 285, 296, 346, 377; 379/1.01, 1.03, 2, 3, 93.01
See application file for complete search history.

(56) References Cited

U.S. PATENT DOCUMENTS

| 7,164,764 | B2 | 1/2007 | Zimmerman et al. |
| 7,830,978 | B2 | 11/2010 | Guenach et al. |
| 7,843,990 | B2 | 11/2010 | Kramer et al. |
| 7,991,122 | B2 | 8/2011 | Cioffi et al. |
| 8,009,665 | B2 | 8/2011 | Cioffi et al. |
| 8,081,560 | B2 | 12/2011 | De Lind Van Wijngaarden et al. |
| 2003/0108063 | A1 | 6/2003 | Joseph et al. |
| 2004/0090927 | A1 | 5/2004 | Zimmerman et al. |
| 2006/0274893 | A1* | 12/2006 | Cioffi et al. ............ 379/399.01 |
| 2007/0165533 | A1 | 7/2007 | Wu |
| 2008/0247446 | A1 | 10/2008 | Kramer et al. |
| 2008/0298444 | A1* | 12/2008 | Cioffi et al. ................ 375/222 |
| 2009/0175156 | A1* | 7/2009 | Xu ............................ 370/201 |
| 2009/0207985 | A1* | 8/2009 | Cioffi et al. ................ 375/222 |
| 2010/0202281 | A1 | 8/2010 | Kramer et al. |
| 2011/0200080 | A1* | 8/2011 | Fang et al. ................. 375/222 |

OTHER PUBLICATIONS

George Ginis, "Low-Power modes for ADSL2 and ADSL2+", SPAA021, Broadband Communications Group, Texas Instrument, White Paper, Jan. 2005, 14 pages.
PCT International Search Report dated Dec. 30, 2009 (PCT/US2009/003241), 4 pages.

(Continued)

*Primary Examiner* — Tesfaldet Bocure
(74) *Attorney, Agent, or Firm* — J. F. McCabe

(57) ABSTRACT

A method includes maintaining temporally parallel DSL data communication sessions with DSL modems of a group via a set of lines. The method includes, in response to substantially stopping to receive DSL communications from one of the DSL modems via one of the lines, transmitting a substantially reduced average power to the one of the lines and monitoring the one of the lines to determine whether DSL communications have restarted being received from the one of the DSL modems. The method also includes resuming the maintaining of the temporally parallel DSL communication sessions in response to the monitoring determining that DSL communications have restarted being received from the one of the DSL modems.

21 Claims, 6 Drawing Sheets

OTHER PUBLICATIONS

Danny Van Bruyssel, et al, "G.vdsl: Impact of a disorderly leaving event on a precoded VDSL2 system ", *International Telecommunication Union*, Telecommunication Standardization Sector, Study Group COM 15-C542-E, May 2007, 7 pages.

U.S. Appl. No. 12/060,653, filed Apr. 1, 2008, A. Ashikhmin et al.

U.S. Appl. No. 11/848,684, filed Aug. 31, 2007, A. De Lind Van Wijngaarden, et al.

U.S. Appl. No. 11/897,809, filed Aug. 31, 2007, M. Guenach et al.

U.S. Appl. No. 11/897,877, filed Aug. 31, 2007, G. Kramer, et al.

ITU-T, Telecommunication Standardization Sector of ITU, G.993.2, Series G: Transmission Systems and Media, Digital Systems and Networks, Digital sections and digital line system—Access networks, "Very high speed digital subscriber line transceivers 2 (VDSL2)", (Feb. 2006) 252 pgs.

PCT International Search Report, PCT/US2010/032868, International Filing Date Apr. 29, 2010, Date of Mailing Dec. 16, 2010, 5 pages.

* cited by examiner

SIGNAL SUSPENSION AND RESUMPTION IN DSL SYSTEMS

This application claims the benefit of U.S. Provisional Application No. 61/130,979 filed Jun. 4, 2008.

BACKGROUND

1. Technical Field

The invention relates to multiple channel communication systems.

2. Discussion of the Related Art

This section introduces aspects that may be helpful to facilitating a better understanding of the inventions. Accordingly, the statements of this section are to be read in this light and are not to be understood as admissions about what is in the prior art or what is not in the prior art.

Many digital subscriber line (DSL) communication systems are susceptible to downlink and uplink crosstalk between the local-end telephone lines that connect DSL modems of a central office (CO) to DSL modems at customer premises. The crosstalk may be caused, in part, by inductive coupling between twisted pairs of the local-end telephone lines. The crosstalk can negatively affect DSL communications between the CO and the customer premises in the uplink and the downlink directions. For example, the crosstalk may reduce distances over which DSL communications can be maintained and/or reduce maximum obtainable DSL data transmission rates.

Some DSL communication systems compensate for the undesired effects of such crosstalk in DSL downlink and uplink communications. To perform such compensation, the DSL communication systems typically measure downlink and uplink channel matrices, i.e., $H_D$ and $H_U$, respectively. From the downlink channel matrix, $H_D$, the CO may precode downlink DSL communications so that DSL modems of the customer premises will receive DSL data signals substantially free of crosstalk-related distortions. From the uplink channel matrix, $H_U$, the CO may decode received uplink DSL communications to produce DSL data signals substantially free of crosstalk-related distortions.

The measurement of the downlink and uplink channel matrices $H_D$ and $H_U$ may be performed during the initialization and tracking of a DSL communication session. Typically, a different pair of channel matrices $H_D$ and $H_U$ is measured for each DSL tone. The measured downlink and uplink channel matrices $H_D$ and $H_U$ may be updated as DSL communication sessions and corresponding lines are added to or removed from the set of DSL sessions being managed by a CO. The compensation of sets of temporally parallel DSL sessions for crosstalk is often referred to as DSL vectoring.

BRIEF SUMMARY

Various embodiments provide DSL communication apparatus and methods that support DSL vectoring. The methods and apparatus are configured to manage responses to events that interrupt DSL communications between a DSL modem of a central office and a DSL modem of a customer premises. The methods and apparatus can limit the harmful effects of crosstalk that such events cause on the DSL communications between other DSL modems. The methods can also reduce the need to re-measure elements of channel matrices so that the amount of DSL re-initialization can be reduced.

In first embodiments, a method includes maintaining temporally parallel DSL data communication sessions with DSL modems of a group via a set of lines. In response to a substantial stop to reception of DSL communications from one of the DSL modems via one of the lines, the method includes transmitting a substantially reduced average power to the one of the lines and monitoring the one of the lines to determine whether reception of DSL communications has restarted from the one of the DSL modems. The method also includes resuming the maintaining of the temporally parallel DSL communication sessions in response to the monitoring determining that the reception of DSL communications from the one of the DSL modems has restarted.

In some specific first embodiments, the step of transmitting a substantially reduced average power includes transmitting to the one of the lines over a proper subset of a set of DSL tones used to transmit data to the one of the lines during the step of maintaining. In some such specific embodiments, the step of transmitting a substantially reduced average power may include transmitting to the one of the lines over less than a third of the set of DSL tones used to transmit data to the one of the lines during the step of maintaining.

In some specific first embodiments, the step of resuming includes precoding DSL data signals with a matrix that is substantially a matrix used to precode data signals transmitted to the group during the step of maintaining. In such specific first embodiments, the step of resuming also includes transmitting the precoded DSL data signals to the group.

In some specific first embodiments, the step of resuming includes decoding DSL data signals received from the group with a matrix that is substantially a matrix used to decode data signals received from the group during the step of maintaining. In such specific first embodiments, the step of transmitting a substantially reduced average power may include transmitting DSL data to the one of the lines over less than a third of the DSL tones used to transmit data to the one of the lines during the step of maintaining. In such specific first embodiments, the step of resuming may include precoding DSL data signals with a matrix that is substantially a matrix used to precode data signals transmitted to the group during the step of maintaining. In such specific first embodiments, the step of resuming also includes transmitting the precoded DSL data signals to the group.

In some specific first embodiments, the step of resuming may be performed without re-measuring elements of a channel matrix for the set of lines.

In second embodiments, a method includes maintaining a DSL communication session that uplinks data from a local DSL modem to a distant DSL modem over a line. The method includes, in response to a substantial stop to reception of DSL communications from the distant DSL modem, transmitting a substantially reduced average power to the line in the uplink direction and monitoring the line to determine whether reception of DSL signals from the distant DSL modem has restarted. The method also includes resuming the DSL communication session with the distant DSL modem in response to the monitoring determining that the reception of DSL signals from the distant DSL modem has restarted.

In some specific second embodiments, the step of transmitting a substantially reduced average power includes transmitting to the line in the uplink direction over a proper subset of DSL tones used to uplink the data during the step of maintaining.

In some specific second embodiments, the step of transmitting a substantially reduced average power includes transmitting to the line over less than a third of a set of DSL tones used to uplink the data during the step of maintaining.

In some specific second embodiments, the step of resuming is performed without re-measuring elements of a channel matrix for the DSL communication session.

Some specific second embodiments include participating in a procedure that determines how to precode DSL communications to a vectoring group that includes the local DSL modem.

Some specific second embodiments include participating in a procedure that determines how to decode DSL communications received from a vectoring group that includes the local DSL modem.

In third embodiments, apparatus include a first set of centrally controlled DSL modems capable of maintaining a set of temporally parallel DSL communication sessions with DSL modems of a second set via a set of lines. One of the centrally controlled DSL modems is configured to substantially reduce an average power transmitted to one of the lines in response to a substantial stop of reception of DSL communications from one of the DSL modems of the second set via the one of the lines and is configured to monitor the one of the lines to determine whether reception of DSL communications from the one of the DSL modems of the second set has restarted. The set of centrally controlled DSL modems is configured to resume the set of parallel DSL communication sessions in response to the restart of reception of DSL communications from the one of the DSL modems of the second set.

In some specific third embodiments, the one of the centrally controlled DSL modems is configured to substantially reduce the power by transmitting over less than a third of a set of DSL tones available to transmit data to the one of the DSL modems of the second set.

In some specific third embodiments, the one of the centrally controlled DSL modems is configured to resume the set of parallel DSL communication sessions by precoding data signals for DSL transmission with a matrix used to precode data signals prior to the substantial stop of reception of DSL communications from the one of the DSL modems of the second set.

In some specific third embodiments, the set of centrally controlled DSL modems is configured to resume the set of parallel DSL communication sessions by decoding received DSL data signals with a matrix used to decode received DSL data signals prior to the substantial stop of reception of DSL communications from the one of the DSL modems of the second set.

BRIEF DESCRIPTION OF THE DRAWINGS

In the Figures and text, like reference numerals indicate elements with similar or the same functions.

In the Figures, the relative dimensions of some features may be exaggerated to more clearly show one or more of the structures being illustrated.

Herein, various embodiments are described more fully by the Figures and the Detailed Description of Illustrative Embodiments. Nevertheless, the inventions may be embodied in various forms and are not limited to the embodiments described in the Figures and Detailed Description of Illustrative Embodiments.

DETAILED DESCRIPTION OF ILLUSTRATIVE EMBODIMENTS

U.S. provisional Application No. 61/130,979, "Signal Suspension And Resumption in DSL Systems" filed Jun. 4, 2008, by Adriaan J. de Lind van Wijngaarden, Jochen Maes, Carl J. Nuzman, and Danny van Bruyssel is incorporated herein by reference in its entirety.

Figure 1:
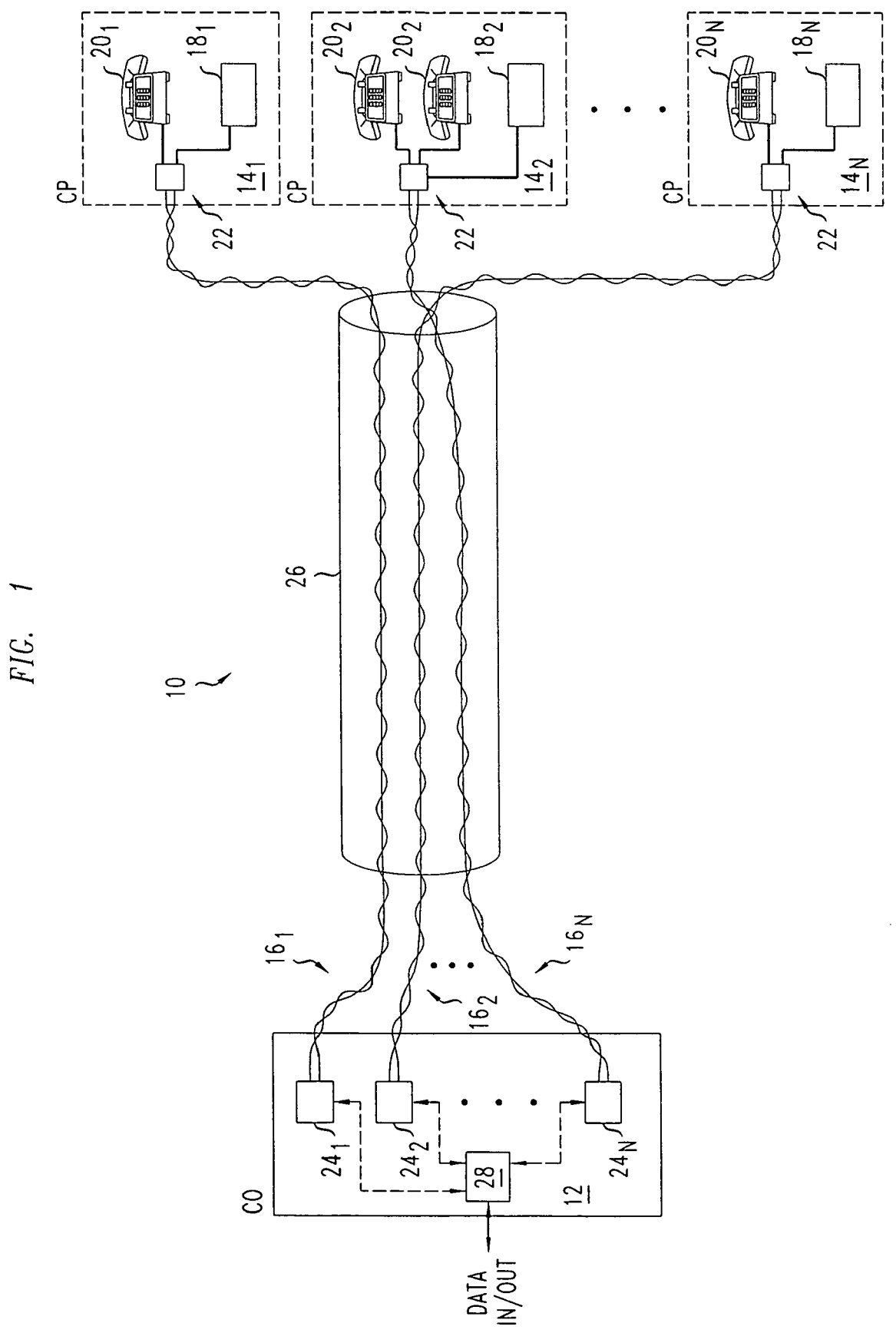
FIG. 1 is a diagram schematically illustrating a DSL communication system that supports DSL vectoring for as many as N temporally parallel DSL communication sessions.

FIG. 1 schematically illustrates a portion 10 of one example of a telephone system that supports voice and DSL communications between a central office (CO) 12 of a DSL service provider or a local telephone company and a set of customer premises (CP) $14_1, 14_2, \ldots, 14_N$. The CO 12 has a set of DSL modems $24_1, 24_2, \ldots, 24_N$ centrally controlled by a controller 28. Each CP $14_1, 14_2, \ldots, 14_N$ has a DSL modem $18_1, 18_2, \ldots, 18_N$, local wiring 22 and optionally telephones $20_1, 20_2, \ldots, 20_N$. The DSL modems $24_1, 24_2, \ldots, 24_N$ of the CO 12 and the DSL modems $18_1, 18_2, \ldots, 18_N$ of the CPs $14_1, 14_2, \ldots, 14_N$ are connected through local-end lines $16_1, 16_2, \ldots, 16_N$ and the local wiring 22 at the CPs $14_1, 14_2, \ldots, 14_N$. The local-end lines $16_1, \ldots, 16_N$ are, e.g., ordinary local-end telephone lines or twisted pairs. Each local-end line $16_1, \ldots, 16_N$ connects one of the DSL modems $24_1, \ldots, 24_N$ of the CO 12 to a corresponding one of the DSL modems $18_1, \ldots, 18_N$ of the set of CPs $14_1, \ldots, 14_N$. The controller 28 of the CO 12 operates a DSL vectoring group of the DSL modems $24_1, \ldots, 24_N$ of the CO 12, i.e., a subset of the DSL modems $24_1, \ldots, 24_N$ having active DSL communication sessions.

Some of the local-end lines $16_1, \ldots, 16_N$ may have segments co-located in a binder 26, e.g., a cable. The binder 26 typically holds some of the local-end lines $16_1, \ldots, 16_N$ therein in close physical proximity over long distances. For that reason, some of the local-end lines $16_1, \ldots, 16_N$ may suffer from significant inter-line crosstalk, e.g., caused by inductive coupling in the binder 26.

The controller 28 of the CO 12 implements some form of DSL vectoring to compensate for undesired effects of crosstalk on the uplink and/or downlink. In a time slot, the controller 28 may precode K DSL data signals prior to transmission from a group of K active DSL modems $24_1, \ldots, 24_N$ for downlink transmission to K active DSL modems $18_1, \ldots, 18_N$ of the CPs $14_1, \ldots, 14_N$. In a time slot, the controller 28 may also decode DSL data signals received via uplink transmissions from the K active DSL modems $18_1, \ldots, 18_N$ of the CPs $14_1, \ldots, 14_N$ prior to extracting data from K temporally parallel data streams therein. The CO 12 may implement DSL vectoring for uplink and/or downlink DSL transmissions.

Examples of DSL systems and methods that implement techniques for DSL vectoring therein may be described in: U.S. patent application Ser. No. 12/060,653, filed on Apr. 1, 2008 by Alexei Ashikhmin, Adriaan J. de Lind van Wijngaarden, Gerhard G. Kramer, Carl J. Nuzman, and Philip A. Whiting; U.S. patent application Ser. No. 11/848,684, filed on Aug. 31, 2007 by Adriaan J. de Lind van Wijngaarden, Gerhard G. Kramer, Carl J. Nuzman, Philip A. Whiting, and Miroslav Zivkovic; U.S. patent application Ser. No. 11/897, 809, filed on Aug. 31, 2007 by Mamoun Guenach, Gerhard G. Kramer, Jerome Louveaux, Jochen Maes, Michael Peeters, Philip A. Whiting, Luc Vandendorpe, Jan S. Verlinden, Geert Bert Ysebaert, and Miroslav Zivkovic; and/or U.S. patent application Ser. No. 11/897,877, filed on Aug. 31, 2007 by Gerhard G. Kramer, Philip A. Whiting, and Miroslav Zivkovic. The four patent applications of the above list are incorporated herein by reference in their entirety.

Precoding K, temporally parallel, DSL communication streams typically involves evaluating a matrix product $P \cdot X$ for each transmission time slot and DSL tone, e.g., in the controller 28. Here, P is the K×K precoding matrix, and X is the K-vector of DSL data signals for the time slot and a corresponding DSL tone. For each DSL tone, the "j" active DSL modem $24_1, \ldots, 24_N$ of the CO 12 transmits element $(P \cdot X)_j$ to the local-end line $16_1, \ldots, 16_N$ directly connecting to the "j" active DSL modem $18_1, \ldots, 18_N$ of the set of CPs $14_1, \ldots, 14_N$. Here, the K values of "j" index the active DSL communication streams. Due to the precoding, the "j" active DSL modem $18_1, \ldots, 18_N$ of the set of CPs $14_1, \ldots, 14_N$ would receive a DSL signal of the approximate form $D_j \cdot X_j$ in the presence of crosstalk and the absence of other types signal distortions such as noise, i.e., $D_j \cdot X_j = (H_D \cdot P \cdot X)_j$. Thus, the precoding typically removes-crosstalk, but may not remove line-dependent signal attenuation. To perform such advantageous precoding, the CO 12 usually needs to evaluate the precoding matrix P for the DSL vectoring group, e.g., by estimating the downlink channel matrices $H_D$ for the corresponding DSL tones.

Decoding of K, temporally parallel, DSL communication streams typically involves evaluating a matrix product $M \cdot Y$ for each transmission time slot and each DSL tone, e.g., in the controller 28. Here, M is the K×K decoding matrix, and Y is the K-vector of received DSL data signals for the corresponding time slot and DSL tone. In the presence of crosstalk and absence of other signal distortions, e.g., noise, the vector Y is $H_U \cdot U$ where the "p" active DSL modem $18_1, \ldots, 18_N$ of the set of CPs $14_1, \ldots, 14_N$ transmits $(U)_p$ for p=1, ..., K. The "j" element of the matrix product $M \cdot Y$ has the approximate form $D'_j \cdot U_j$ in the presence of crosstalk and the absence of other types signal distortions, e.g., noise. Thus, decoding typically removes crosstalk between uplink DSL communications, but may not remove line-dependent attenuation. To perform such advantageous decoding, the CO 12 usually needs to evaluate the decoding matrix M for the DSL vectoring group, e.g., by estimating the uplink channel matrix $H_U$ for the corresponding DSL tones.

It is often desirable to evaluate the precoding and/or decoding matrices P, M when a DSL modem $18_1, \ldots, 18_N$ of the set of CPs $14_1, \ldots, 14_N$ begins or ends a DSL communication session, i.e., joins or leaves a DSL vectoring group. The DSL communications of a joining DSL modem $18_1, \ldots, 18_N$ of the set of CPs $14_1, \ldots, 14_N$ may produce substantial crosstalk in the DSL communications of those DSL modems $18_1, \ldots, 18_N, 24_1, \ldots, 24_N$ already in a DSL vectoring group. Similarly, the DSL communications of those DSL modems $18_1, \ldots, 18_N, 24_1, \ldots, 24_N$ already in a DSL vectoring group will often cause significant crosstalk in the DSL communications between the newly joining DSL modems $18_1, \ldots, 18_N$ of set of the CPs $14_1, \ldots, 14_N$. Thus, it is often useful to re-evaluate elements of the precoding matrix P and/or the decoding matrix M at such joining and leaving events.

The evaluation of precoding and decoding matrices P and M often involves performing procedures that execute during substantial time. Some such procedures involve measuring DSL pilot signals to determine direct channel attenuations and crosstalk levels, measuring channel noise levels and/or performing handshaking operations. Indeed, the evaluation of the precoding and decoding matrices P and M may even be part of conventional initialization procedures that execute for as much as 30 seconds before completing. To avoid such long evaluation periods from interfering with DSL communications, it may be advantageous to avoid evaluating the matrices P or M when unnecessary.

The inventors have realized that re-measuring elements of the preceding matrix P and/or the decoding matrix M may not be efficient in all situations where a pair of DSL modems $18_1, \ldots, 18_N, 24_1, \ldots, 24_N$ joins a DSL vectoring group. In particular, such DSL modems may request to re-join a DSL vectoring group shortly after detecting a loss-of-signal event in which reception of DSL signals substantially stops, i.e., is interrupted. Such loss-of-signal events may occur between one or more active DSL modem(s) $24_1, \ldots, 24_N$ of the CO 12 and one or more corresponding active DSL modem(s) $18_1, \ldots, 18_N$ of the set of CPs $14_1, \ldots, 14_N$. Loss-of-signal events may occur, e.g., transitory disconnection(s) of electrical contact(s) of the line(s) $16_1, \ldots, 16_N$ due to vibration(s) thereof, unplugging of one or more of the active DSL modem(s) $18_1, \ldots, 18_N, 24_1, \ldots, 24_N$, a powering down of one or more of the active DSL modem(s) $18_1, \ldots, 18_N, 24_1, \ldots, 24_N$, or abrupt transient(s) in the output power(s) of the active DSL modem(s) $18_1, \ldots, 18_N, 24_1, \ldots, 24_N$. Some such types of loss-of-signal events may be alleviated rapidly without substantially changing of the form of the physical communication media, which supports the direct and crosstalk channels, from its form just prior to the loss-of-signal event. That is, the form(s) of the sets of corresponding channel matrices $H_U$, $H_D$ for the relevant set of DSL tone frequencies may be very similar just before the loss-of-signal event and just after alleviation of the loss-of-signal event. Examples of alleviations that may return a physical multi-channel communication medium substantially to its form just prior to the loss-of-signal event may include: closing transitorily open electrical contact(s), re-plugging local wiring 22 to DSL modem (s), and/or re-powering up powered-down DSL modem(s). After alleviation of such types of loss-of-signal events, re-use of the preceding matrix P and/or the decoding matrix M, which were used just prior to the loss-of-signal event, may not substantially lower the quality of the crosstalk compensation afforded by preceding and/or decoding in DSL communications. In addition, the re-use of the previously used precoding and/or decoding matrices P, M may typically significantly reduce down times, because the one or more rejoining DSL modems $18_1, \ldots, 18_N, 24_1, \ldots, 24_N$ will be able to resume DSL communications activity, i.e., to transmit and/or receive DSL data signals, without waiting for a re-evaluation of the precoding and/or decoding matrices P, M.

Various embodiments of methods and apparatus support DSL vectoring in manners that respond to loss-of-signal events where a DSL modem determines that reception of DSL communications has substantially stopped, i.e., is interrupted. The methods and systems can resume the DSL communications in response to determining that reception of DSL communications has restarted, i.e., in response to determining that the loss-of-signal event has been alleviated without re-measuring elements of precoding and/or decoding matrices.

Figure 2A:
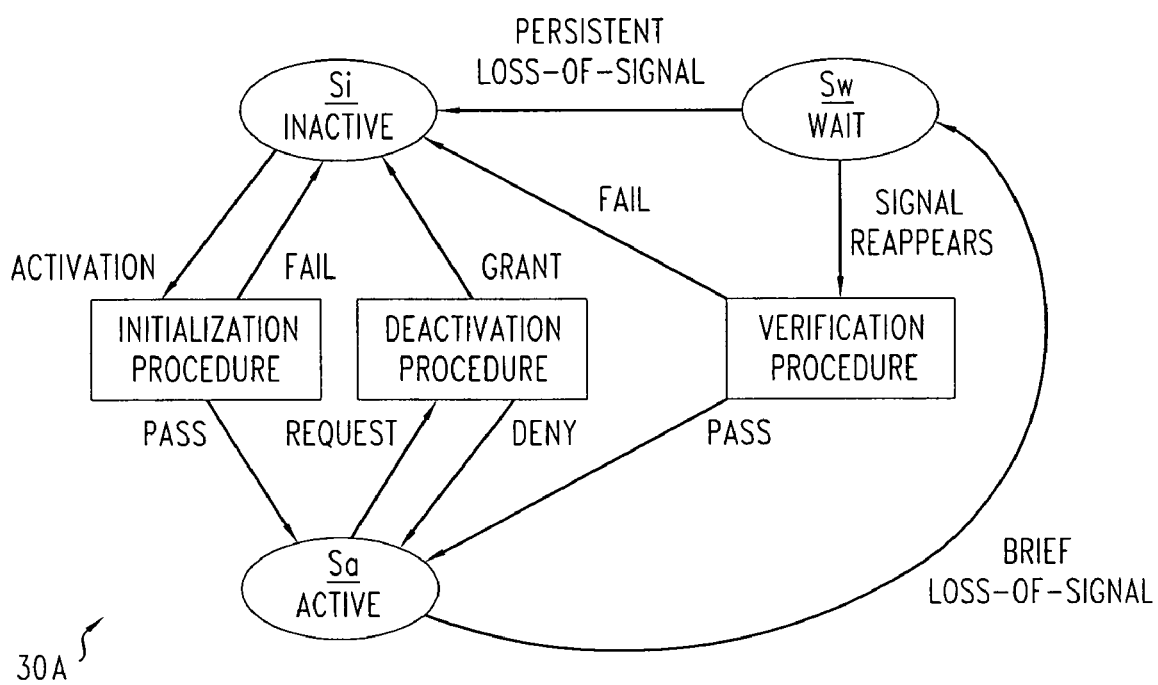
FIG. 2a is a state diagram illustrating states of a pair of corresponding DSL modems during operation of a DSL communication system, e.g., the DSL communication system of FIG. 1.
Figure 2B:
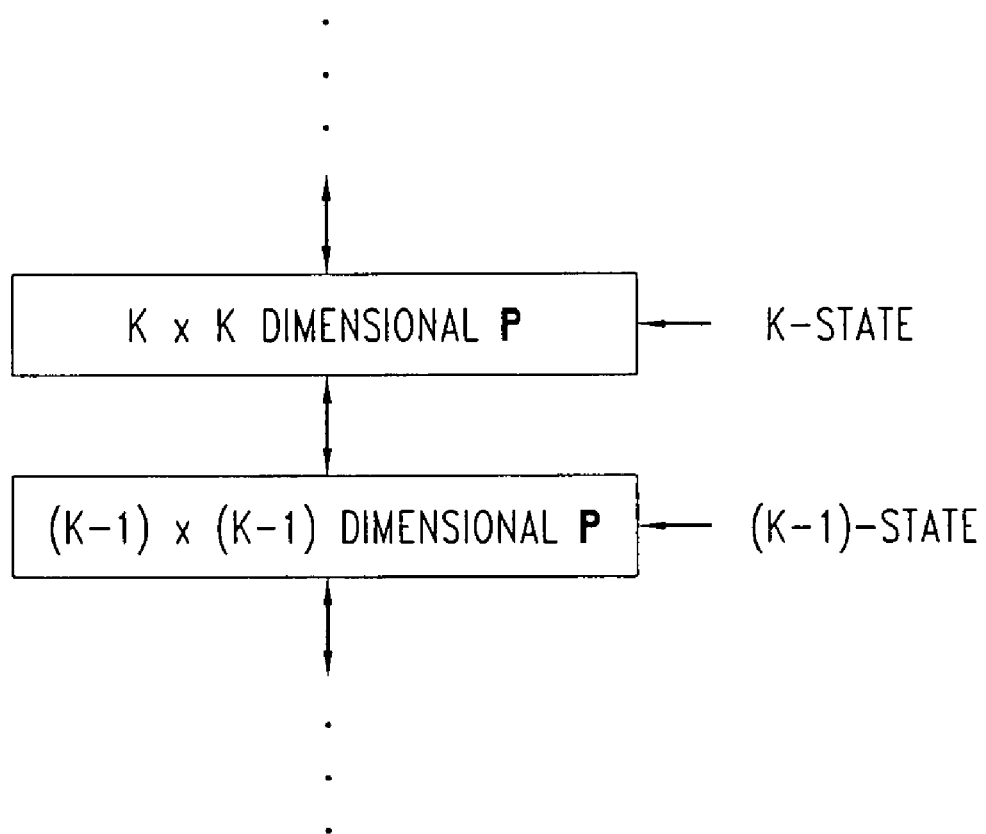
FIG. 2b is a state diagram illustrating states of a preceding matrix P during operation of an example of a DSL communication system according to FIG. 2a, e.g., operation of the DSL communication system of FIG. 1.
Figure 3:
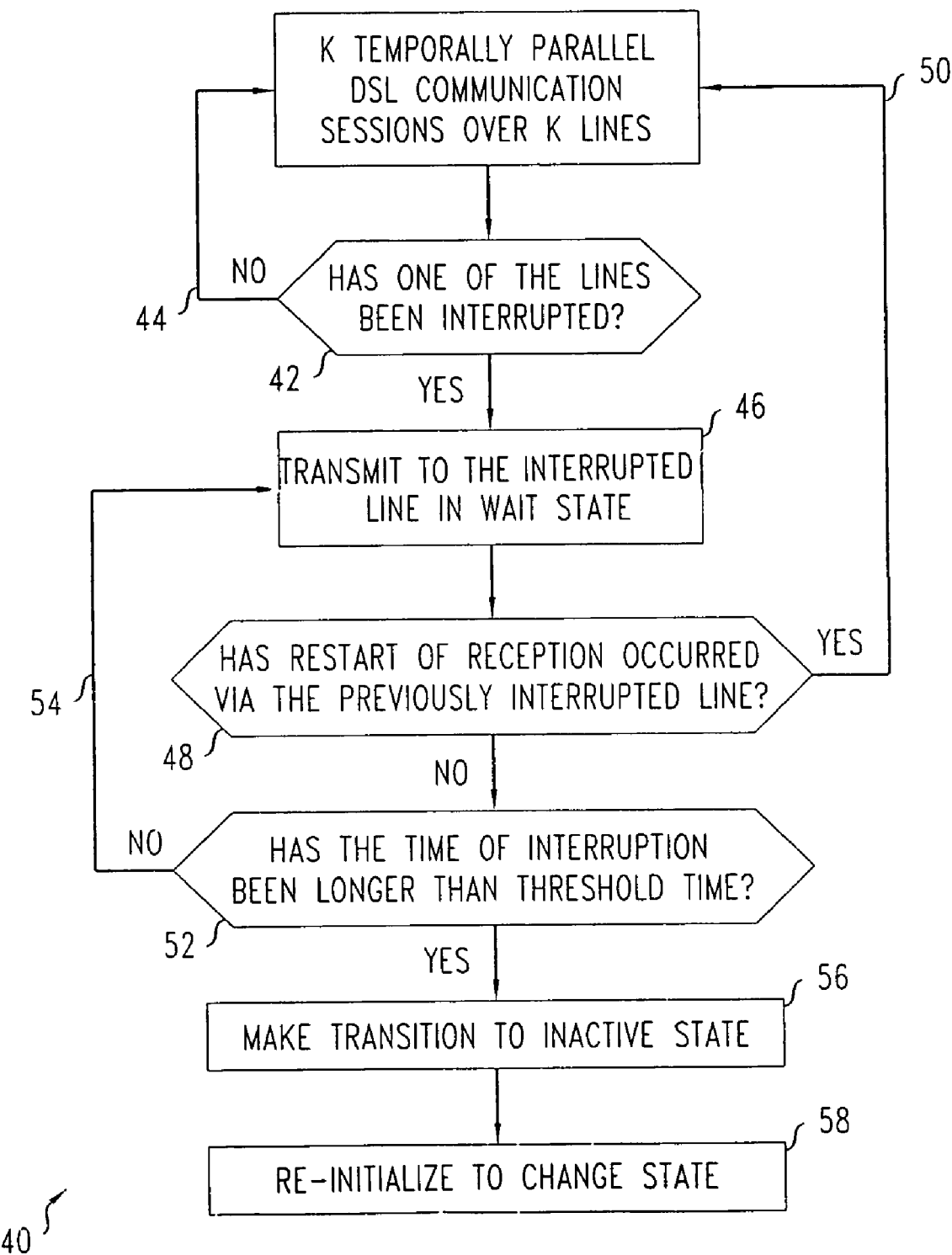
FIG. 3 is a flow chart illustrating a method of operating DSL modems of a central office (CO) in a DSL system supporting K temporally parallel DSL sessions, e.g., the DSL communication system of FIGS. 1, 2a, 2b, and 2c.

The various methods and apparatus are illustrated by state diagrams 30a, 30b, 30c of FIG. 2a and FIGS. 2b and/or 2c and methods 40, 60 as illustrated in FIGS. 3 and/or 4. The state diagrams 30a, 30b, 30c describe a DSL communication system having a set of N centrally controlled DSL modems of a DSL provider or telephone company, e.g., the DSL modems $24_1, \ldots, 24_N$ of the CO 12 in FIG. 1, N DSL modems of DSL customers, e.g., the DSL modems $18_1, \ldots, 18_N$ of the CPs $24_1, \ldots, 24_N$, of FIG. 1, and a set of N lines, e.g., the lines $16_1, \ldots, 16_N$ of FIG. 1. Each of the lines directly connects one DSL modem of a DSL customer to a corresponding DSL modem of the DSL provider and/or local telephone company. The DSL communication system can perform DSL vectoring that includes precoding and/or decoding of temporally parallel sets of DSL data signals, e.g., in the controller 28 of FIG. 1.

Figure 2C:
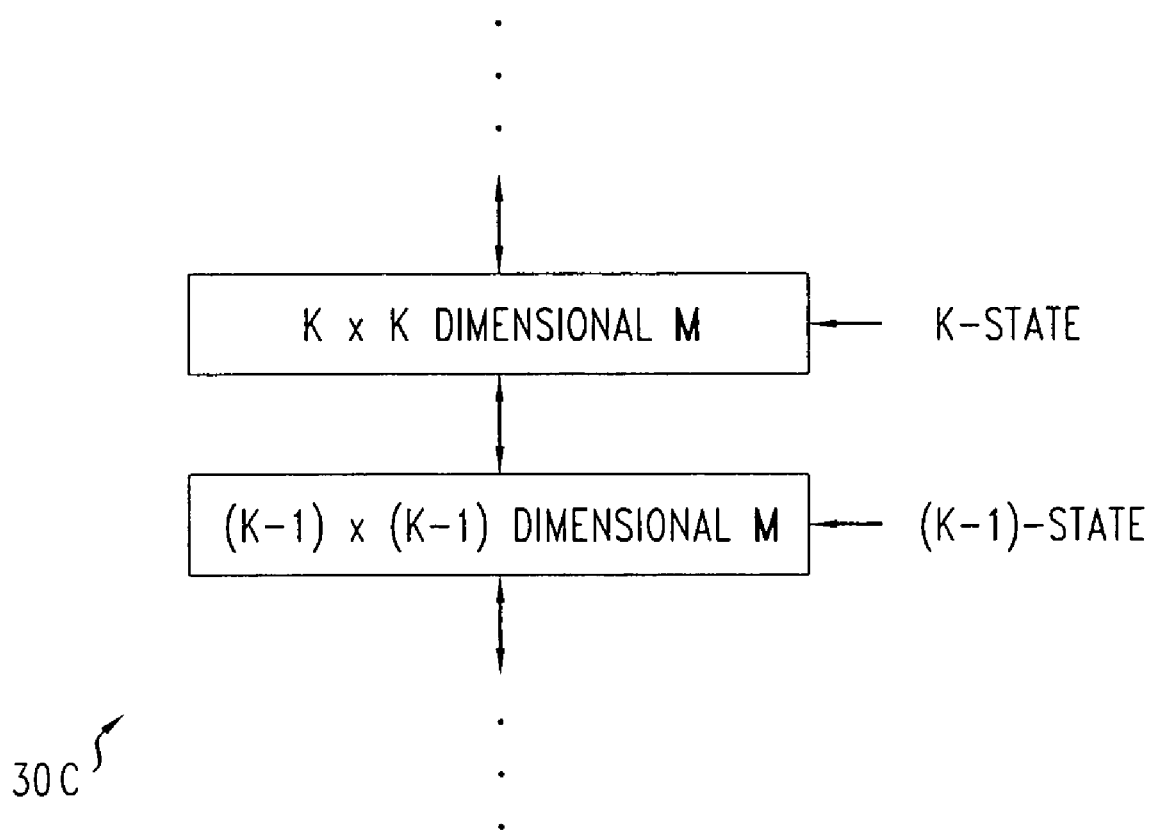
FIG. 2c is a state diagram illustrating states of a decoding matrix M during operation of an example of a DSL communication system according to FIG. 2a, e.g., operation of the DSL communication system of FIG. 1.

The state diagrams 30a, 30b, 30c describe different portions of the DSL communication system. The state diagram 30a of FIG. 2a illustrates a pair of DSL modems that is directly affected by a loss-of-signal event. This pair of DSL modems can communicate during a DSL data communication session and includes one DSL modem of a DSL customer and one DSL modem of a DSL provider or telephone company. The state diagram 30b of FIG. 2b illustrates a series of states of the precoding matrix P, e.g., the precoding matrix stored in and used by the controller 28 of FIG. 1. The state diagram 30c of FIG. 2c illustrates a series of states of the decoding matrix M, e.g., the decoding matrix stored in and used by the controller 28 of FIG. 1. Different states of the preceding and decoding matrices P, M are indexed by an integer K, which is the matrix row and column sizes thereof and is the number of pairs of DSL modems currently maintaining DSL data communication sessions, i.e., the current size of DSL vectoring group.

Referring to FIG. 2a, the state diagram 30a includes active state Sa, inactive state Si, and wait state Sw. These states are available to the illustrated pair of DSL modems. The illustrated pair of DSL modems can move between the three different states Sa, Si, Sw via initialization, deactivation, and verification procedures. The illustrated pair of DSL modems can also move between the different states Sa, Si, Sw in response to brief and persistent loss-of-signal events. Thus, both the procedures and the events are able to change the state of the illustrated pair of DSL modems.

In the active state Sa, the illustrated pair of DSL modems maintains active DSL data communications there between.

In the active state Sa, either DSL modem of the pair illustrated by FIG. 2a may request an orderly deactivation of its corresponding DSL communication session. For example, one of the DSL modems $18_1, \ldots, 18_N$ of the set of CPs $14_1, \ldots, 14_N$ may make such a request when a local DSL-reliant process of the corresponding DSL customer terminates. Alternatively, for example, one of the DSL modems $24_1, \ldots, 24_N$ of the CO 12 can make such a request. If the deactivation request is granted, e.g., via negotiation, the illustrated pair of DSL modems makes a transition to the inactive state Si. If the deactivation request is denied, the illustrated pair of DSL modems remains in the active state Sa.

In the deactivation request is granted, the size of the DSL vectoring group also decreases. If the DSL vectoring group has dimension K when the illustrated pair of DSL modems is in the active state Sa, the DSL vectoring group will have dimension (K−1) in the inactive state Si to which the deactivation procedure transits the DSL communication system. Thus, referring to FIGS. 2b and 2C, any precoding and/or decoding matrices P, M would be in K-states, i.e., be matrices of dimension K×K, for the exemplary active state Sa and would make a transition to (K−1)-states for the inactive state Si. That is, the deactivation procedure would leave (K−1) pairs of DSL modems active after the transition to the inactive state Si by the illustrated pair of DSL modems. For this example, the dimension of any precoding and/or decoding matrices would be changed to the (K−1)-state, i.e., to a matrix of dimension (K−1)×(K−1), by such a transition.

In the inactive state Si, the illustrated pair of DSL modems of FIG. 2a do not maintain an active DSL communication session. But, the illustrated pair of DSL modems can activate an initialization procedure between the illustrated pair and any other pairs of active DSL modems to enable the illustrated pair of DSL modems to start a DSL communication session, i.e., to join the current DSL vectoring group. If the initialization procedure succeeds, the DSL communication system passes to the active state Sa in which, at least, the illustrated pair of modems is added to the DSL vectoring group. If the initialization procedure fails, the DSL communication system remains in the inactive state Si with no changes to the vectoring group.

After the transition to the active state Sa, K pairs of DSL modems maintain temporally parallel, active DSL communication sessions with the precoding and/or decoding matrices P, M in K-states of FIGS. 2b and 2c. Thus, the initialization procedure determines elements of a preceding matrix P and/or decoding matrix M for the final vectoring group of dimension K. In some embodiments, this determination may involve transmitting and measuring pilot signals between the K DSL modems $24_1, \ldots, 24_N$ of the CO 12 and the K DSL modems $18_1, \ldots, 18_N$ of CPS $14_1, \ldots, 14_N$ in the desired new vectoring group or subsets thereof.

Referring again to FIG. 2a, the DSL modems of the illustrated pair can also make a transition from the active state Sa to the wait state Sw in response to determining that reception of DSL communications between these DSL modems has substantially stopped, i.e., a loss-of-signal event. For example, such an event may occur when one or more of the K lines $16_1, \ldots, 16_N$ of FIG. 1 for the configuration of the DSL communication system corresponding to the active state Sa is interrupted or broken or when one or more of the K active DSL modems of DSL customers powers down as already discussed above.

In the wait state Sw, the DSL modems of the illustrated pair monitor for reception of DSL communications to restart. In the wait state Sw, both DSL modems of the illustrated pair substantially reduce power transmissions to the local-end line that previously connected these DSL modems in the active state Sa while still transmitting continuity test signals thereto. In particular, in the wait state Sw, the two illustrated DSL modems may transmit test DSL signals to the local-end line, e.g., over a sparse, proper subset of the set of DSL tones available to carry DSL data signals during active DSL data communication sessions, i.e., of the active state Sa. The sparse, proper subset may include, e.g., less than or equal to ⅓ of the number of DSL tones available for ordinary DSL data transmissions. The sparse, proper subset may include, e.g., the few lowest frequency DSL tones used for such ordinary DSL data communication sessions. Often, the DSL test tones may be selected to produce low crosstalk interference with the remaining active DSL communication sessions. For example, limiting such transmissions of DSL test signals to reduced power or to a few DSL tones can reduce interference with DSL communications of remaining active DSL communication sessions of the DSL vectoring group. By monitoring this sparse, proper subset of the set of DSL tones available for use in ordinary DSL data communications, the illustrated pair of DSL modems may determine whether reception of DSL communications has restarted. In response to determining that such a restart has occurred, the illustrated pair of DSL modems can substantially resume their previous active DSL data communication session, e.g., using stored matrices P and M used just prior to the loss-of-signal event to resume their previous active state Sa or using matrices P and M with small differences from such earlier P and M used matrices.

A brief loss-of-signal induced transition from the active state Sa to the wait state Sw does not decrease, e.g., the number of active pairs DSL modems. Instead, the illustrated pair of DSL modems transmits test DSL signals at a reduced power in the wait state Sw. Thus, such a transition does not cause the preceding matrix P or the decoding matrix M to make a transition to a new state in FIGS. 2b and/or 2c. Indeed, the previously used forms of the precoding and/or decoding matrices are used in the presence of reduced transmission power from the illustrated pair of DSL modems. The inventors believe that such low power operation will typically still provide substantial compensation of harmful effects of interline crosstalk if the off-diagonal elements of the channel matrices $H_U$ and $H_D$ are much smaller than diagonal elements thereof.

Nevertheless, in the wait state Sw, a determination that the loss-of-signal event is persistent, e.g., continues over a time of preselected and substantial length, will typically cause the illustrated pair of DSL modems to make a transition from the wait state Sw to the inactive state Si. Such a transition decreases the number of active pairs DSL modems by making the illustrated pair inactive. Thus, such a transition will also cause, e.g., a transition from a K-state of any preceding matrix P and/or decoding matrix M in FIGS. 2b and/or 2c to (K−1)-states thereof. That is, if K pairs of DSL modems were active in the original active state Sa, (K−1) pairs of the DSL modems will remain active at the start of the transition to a resulting inactive state Si.

Referring again to FIG. 2a, the illustrated pair of DSL modems pass from the wait state Sw to the active state Sa, in some embodiments, e.g., in response to passing an optional verification procedure. The verification procedure measures, e.g., some elements of the uplink and/or downlink channel matrices $H_U$, $H_D$, e.g., for a few DSL tones, to confirm that physical crosstalk properties of the set of lines and/or other DSL transmission parameters or settings have not substantially changed since prior to the loss-of-signal event. For example, the optional verification procedure may be used to confirm that the measured elements and/or parameters have not changed by more than preselected amounts between their values prior to the loss-of-signal event and their values when the reception of DSL signals restarts. The illustrated pair of DSL modems may also pass from the wait state Sw to the inactive state Sa in response to a failure of such a verification procedure. Such an optional verification procedure would typically indicate that the channel matrices or P and/or M matrices of the DSL system had substantially changed and would probably not substantially resume their previous forms in response to alleviation of the loss-of-signal event.

Figure 4:
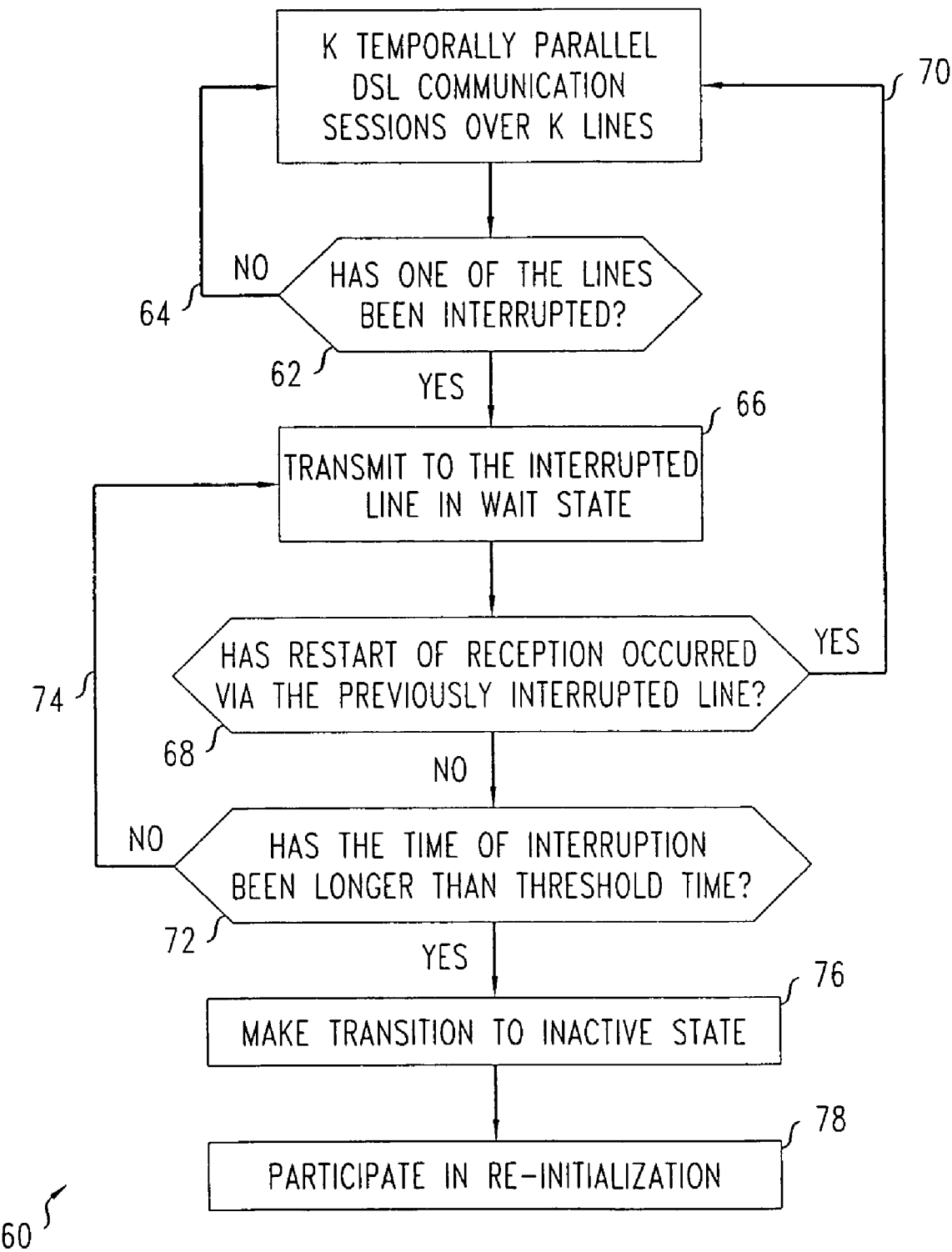
FIG. 4 is a flow chart illustrating a method of operating DSL modems of customer premises (CP) in a DSL system supporting K temporally parallel DSL sessions, e.g., the DSL communication system of FIGS. 1, 2a, 2b, 2c and 3.

FIGS. 3 and 4 illustrate methods 40, 60 performed by a DSL modem of the DSL provider and/or telephone company, e.g., one of the DSL modems $24_1, \ldots, 24_N$ of FIG. 1, and the DSL modem of the DSL customer, e.g., one of the DSL modems $18_1, \ldots, 18_N$ of FIG. 1, in response to a loss-of-signal event.

Referring to FIG. 3, the method 40 starts when K pairs of DSL modems of the DSL communication system are in active state Sa. In this state, K of the centrally controlled DSL modems of the DSL service provider and/or local telephone company have active DSL data communication sessions with K of the DSL modems of the local DSL customers. In the active state Sa, the K active centrally controlled DSL modems of the DSL provider and/or local telephone company regularly monitor their corresponding local-end lines, e.g., ordinary telephone lines, to determine whether reception of the DSL communications from any of the K active DSL modems of the DSL customers has substantially stopped or has been interrupted (step 42). These active DSL modems may detect such a substantial stop or interruption in reception based on a reduction of a temporally averaged received DSL power on the lines connected directly thereto. For example, a decrease of, at least, 6 dB in the received DSL power when averaged over a subset of the available DSL tones and/or a sequence of several consecutive time slots for DSL data communication may indicate such a substantial stop or interruption in reception of DSL communications from one of the active DSL modems of a DSL customer. If the decrease is much greater than 6 dB, the averaged number of consecutive time slots for indicating such a substantial stop or interruption of reception may be very short, e.g., one or two time slots.

If no substantial stops or interruptions of reception are detected in the K local-end lines connecting the set of K centrally controlled active DSL modems of the DSL provider and/or the telephone company with the set of K active DSL modems of the DSL customers, the K active centrally controlled DSL modems of the DSL provider and/or the telephone company loop back (44) to continue maintaining the vectored group of K DSL communication sessions. In this group, a controller, e.g., the controller 28 of FIG. 1, of the set of K centrally controlled active DSL modems of the DSL provider and/or local telephone company precodes DSL data for transmission to the K lines with a precoding matrix, P, and/or decodes DSL data received from said group of K lines with a decoding matrix, M.

If a substantial stop or interruption is detected in the reception of DSL communications from one of said K local-end lines, the active centrally controlled DSL modem of the DSL provider and/or the local telephone company that is directly connected to one of said K local-end lines will enter into a wait state Sw (step 46). In the wait state Sw, this centrally controlled DSL modem substantially reduces the time-averaged power that it transmits to the line from which the substantial stop or interruption of DSL communications was detected. For example, this centrally controlled DSL modem may transmit DSL test signals on only a few of the available DSL tones for the line or may transmit DSL test signals at a lower time-averaged power level. The reduction in the time-averaged power transmitted to said one of the K local-end lines will lower the crosstalk that said DSL transmissions produce in the remaining (K−1) active DSL communication sessions. Such crosstalk might otherwise occur and be substantially uncompensated, because an interruption of one of the K local-end lines may change inductive coupling(s) between said one of the K local-end lines and the remaining (K−1) local-end lines that carry DSL data communications and/or may change reflection properties of the interrupted one of the local-end lines. In the wait state Sw, such a quasi-absence of direct DSL communications to the one of the K local-end lines from which reception is substantially stopped or interrupted often enables precoding and/or decoding, as performed in the previous active state Sa, to still produce low crosstalk levels at the other 2(K−1) DSL modems that still maintain DSL data communication sessions.

In the wait state Sw, the centrally controlled DSL modem that was previously directly connected via the local-end line from which the reception of DSL communications was interrupted or substantially stopped, monitors this same local-end line to determine whether the reception of DSL communications from the corresponding DSL modem of a DSL customer has restarted, e.g., due to a reconnection of the line or powering up of the distant DSL modem (step 48). The centrally controlled DSL modem may, e.g., monitor a time-averaged received DSL power level in the frequency range of a few selected DSL tones on said same local-end line on which the reception of DSL communications was substantially stopped or interrupted. For example, a measurement on the same local-end line of a power level over the selected DSL tones that is less than 6 dB lower than a time-averaged power level thereon prior to the interruption or substantial stop of reception may be an indication of a restart of said reception of DSL signals there from.

The DSL modem of the DSL customer, which is normally connected to said one of the local-end lines, will continue to directly transmit over said few selected DSL test tones during the wait state Sw so that the corresponding centrally controlled DSL modem can use the detection of the presence of received power on these DSL tones as an indication that the DSL modem of the DSL customer is ready to resume DSL data communications. For said few selected DSL tones, the power level of such direct DSL transmissions is often much higher than the power level produced by crosstalk from the other active DSL modems when the line is not interrupted or the reception of DSL communications there from is not substantially stopped. For that reason, a detection of the restart of the reception of DSL communications is often simplified during such monitoring.

If the centrally controlled DSL modem of the DSL provider and/or local telephone company determines that the reception of DSL communications via the same one of the lines has restarted, the centrally controlled DSL modem returns to its previous active state Sa (50). In such a resumption, the centrally controlled DSL modem then, resumes a DSL communication session with the DSL modem of the DSL customer, which is connected thereto via said same local-end line. Then, the active centrally controlled DSL modems may resume to transmit DSL data signals that are precoded by substantially the same precoding matrix, P, as used to precode data signals for DSL transmissions just prior to the substantial stopping or interruption of reception of DSL communications from the same one of the lines. Also, the same centrally controlled DSL modems of the DSL provider and/or local telephone company may resume to decode received DSL data signals with the same decoding matrix, M, as used to decode received DSL data signals just prior to the substantial stopping or interruption of reception of DSL data communications from the same one of the lines. The substantially same precoding and decoding matrices are typically acceptable when the interruption or substantial stopping of the reception of such DSL data communications is due to a transient effect, i.e., rather than a permanent change.

If it is determined that the previously substantially stopped reception of DSL communications continues, the same centrally controlled DSL modem of the DSL provider and/or local telephone company determines whether the substantial stopping of reception of such DSL communications has persisted more than a selected threshold time of substantial length (step 52). For example, the selected threshold time may be long enough to make probable that any substantial change in the channel matrices would not be substantially reversed by a later restarting of the substantially stopped DSL communications.

In response to determining that the interruption or substantial stopping of reception of such DSL communications has not persisted longer than the selected threshold time, the same centrally controlled DSL modem moves back to the wait state Sw (step 54).

In response to determining that the interruption or substantial stopping of such reception of DSL communications has persisted longer than the selected threshold time, the centrally controlled DSL modem moves to the inactive state Si (step 56).

In the inactive state Si, the same centrally controlled DSL transceiver may participate in and/or make measurements of the uplink and/or downlink channel matrices so that relevant elements of the precoding matrix P and the decoding matrix M can be re-initialized (step 58). Thus, a persistent interruption or a persistent substantial stopping of reception of DSL communications from one of the lines used for DSL communications may cause the centrally controlled DSL modems to perform the initialization procedure with the remaining DSL modems that maintain active DSL communications sessions so that new and more suitable values are found for the elements in the preceding matrix P and/or the decoding matrix M.

Referring to FIG. 4, the method 60 also starts when the DSL communication system is in active state Sa in which K of the DSL modems of the DSL customers have active DSL communication sessions with K centrally controlled DSL modems of the DSL provider and/or local telephone company. In the active state Sa, these K DSL modems of the DSL customers with parallel DSL communication sessions also regularly monitor the lines with the K centrally controlled DSL modems to determine whether an interruption or substantial stopping of reception of DSL communications therefrom has occurred (step 62). These DSL modems of the DSL customers may also detect such an interruption or substantial stopping from a reduction in a time-averaged power on the lines, e.g., ordinary telephone lines, connected directly thereto, e.g., a decrease of, at least, 6 dB in such a power when averaged over a short sequence of consecutive transmission time slots may signal such an interruption or substantial stopping. If the decrease is much greater than 6 dB, the averaged number of consecutive time slots for indicating such a substantial stop or interruption of reception may be very short, e.g., one or two time slots.

If no interruption or substantial stopping of reception of DSL communications is detected from any of the K lines connecting the set of K centrally controlled DSL modems of the DSL provider and/or the telephone company with the set of K DSL modems of the DSL customers, the K DSL modems of the DSL customers loop back (64) to continue to operate as a vectored group of K DSL communication sessions.

If an interruption or substantial stopping of the reception of such DSL communications is detected from one of the K lines, the DSL modem of the DSL customer that directly connects to the one of the lines with interrupted or substantially stopped reception of such DSL communications enters into the wait state Sw (step 66). In the wait state Sw, this same DSL modem of a DSL customer substantially reduces the time-averaged power that it transmits to the same one of the lines. For example, this DSL modem may transmit DSL test signals on only a few of the available DSL tones for the one of the lines or may transmit DSL test signals at a lower average power level. The reduction in transmitted power lowers the crosstalk that said transmissions will produce in the remaining (K−1) active DSL communication sessions. Such crosstalk might otherwise occur and be substantially uncompensated, because an interruption of one of the K local-end lines may change inductive coupling(s) between said one of the K local-end lines and the remaining (K−1) local-end lines that carry DSL data communications and/or may change reflection properties of said one of the local-end lines. Such a quasi-absence of direct DSL communications to the one of the lines associated with the interrupted or substantially stopped reception will often enable precoding and/or decoding, as performed in the previous active state Sa, to still produce low crosstalk in the DSL communication sessions of the other (K−1) active DSL modems of DSL customers.

In the wait state Sw, the same DSL modem of the DSL customer that was previously directly connected via the one of the lines with the interrupted or substantially stopped reception of DSL communications monitors said same line to determine whether the reception of DSL communications has restarted from the corresponding centrally controlled DSL modem of the DSL provider and/or local telephone company, e.g., by a re-correction of the same line (step 68). The same DSL modem of the DSL customer may monitor a selected time-averaged power level in the frequency ranges of a few selected DSL tones on the line with interrupted or substantially stopped reception of DSL communications to detect such a restart. The same DSL modem of the DSL customer will continue to transmit said few selected DSL test tones during the wait state Sw so that the centrally controlled DSL modem can use the presence of power on these DSL test tones as an indication of the restart of reception of DSL communications from the same DSL modem of the DSL customer.

If the same DSL modem of the DSL customer determines that the previously interrupted or substantially stopped reception of DSL communications has restarted, this DSL modem of the DSL customer resumes the previous active state Sa (70). In particular, the centrally controlled DSL modem starts a DSL data communication session with the DSL modem of the DSL customer via said one of the lines from which the reception of DSL communications was previously interrupted or substantially stopped. The centrally controlled DSL modems may transmit DSL data signals with substantially the same precoding used for DSL transmission just prior to the interruption or substantial stopping of reception of DSL communications from the line. Also, the centrally controlled DSL modems may decode the received DSL data signals with substantially the same decoding matrix, M, used to decode received DSL data signals just prior to the interruption or substantial stopping of reception of DSL data communications from the one of the lines.

If the one of the lines still has interrupted or substantially stopped reception of DSL communications, the same DSL modem of the DSL customer determines whether the interruption or substantially stopped reception has persisted more than a selected threshold time (step 72).

In response to determining that the interruption or substantially stopped reception has not persisted longer than the selected threshold time, the DSL modem of the DSL customer makes a transition back to the wait state Sw (step 74).

In response to determining that the interruption or substantially stop of reception has persisted longer than the selected threshold time, the same DSL modem of the DSL customer makes a transition to the inactive state Si (step 76).

In the inactive state Si, the same DSL modem typically participates in a re-initialization procedure that determines, e.g., elements of the one or more channel matrices and/or elements of the precoding matrix P and the decoding matrix M, e.g., via measurements of said elements (step 78). Thus, a persistent interruption of or substantially stopping of reception from one of the lines used for DSL communications often causes the DSL modem of the DSL customer to perform the initialization procedure with the remaining vectoring group of (K−1) DSL modems of the DSL customers so that the elements in the preceding matrix P and the decoding matrix M can be re-determined.

Herein, steps of described methods, e.g., the methods 40, 60 of FIGS. 3-4, may be performed by machine-executable programs of instructions, wherein the programs are encoded on a digital storage media in machine-readable form, e.g., readable by a computer. The digital storage media may be, e.g., a magnetic tape, a magnetic disk, an optical disk, a digital active memory, and/or a hard drive.

From the disclosure, drawings, and claims, other embodiments of the invention will be apparent to those skilled in the art.

What is claimed is:

1. A method, comprising:
   maintaining temporally parallel DSL data communication sessions with DSL modems of a group via a set of lines;
   in response to detecting a loss-of-signal event that causes a substantial stop to reception of DSL communications from one of the DSL modems via one of the lines, transmitting a substantially reduced average power to the one of the lines and monitoring the one of the lines to determine whether reception of DSL signals has restarted from the one of the DSL modems; and
   resuming the maintaining of the temporally parallel DSL communication sessions in response to the monitoring determining that the reception of DSL signals from the one of the DSL modems has restarted.

2. The method of claim 1, wherein the transmitting a substantially reduced average power includes transmitting to the one of the lines over a proper subset of DSL tones used to transmit data to the one of the lines during the maintaining.

3. The method of claim 1, wherein the transmitting a substantially reduced average power includes transmitting to the one of the lines over less than a third of a set of DSL tones used to transmit data to the one of the lines during the maintaining.

4. The method of claim 1,
   wherein the resuming includes precoding DSL data signals with a matrix that is substantially a matrix used to precode data signals transmitted to the group during the maintaining; and
   wherein the resuming includes transmitting the precoded DSL data signals to the group.

5. The method of claim 4, wherein the transmitting a substantially reduced average power includes transmitting DSL data to the one of the lines over less than a third of a set of DSL tones used to transmit data to the one of the lines during the maintaining.

6. The method of claim 1, wherein the resuming includes decoding DSL data signals received from the group with a decoding matrix that is substantially a matrix used to decode data signals received from the group during the maintaining.

7. The method of claim 6, wherein the transmitting a substantially reduced average power includes transmitting DSL data to the one of the lines over less than a third of a set of DSL tones used to transmit data to the one of the lines during the maintaining.

8. The method of claim 6,
   wherein the resuming includes precoding DSL data signals with a matrix that is substantially a matrix used to precode data signals transmitted to the group during the maintaining; and
   wherein the resuming includes transmitting the precoded DSL data signals to the group.

9. The method of claim 1, wherein the resuming is performed without re-measuring elements of a channel matrix for the set of lines.

10. The method of claim 1, wherein the resuming is responsive to performing a verification procedure that includes measuring a plurality of elements of a channel matrix for the set of lines.

11. The method of claim 1, wherein the substantial stop to reception of DSL communications is responsive to a loss-of-signal from more than one of the other DSL modems of the group.

12. A method, comprising:
maintaining a DSL communication session that uplinks data from a local DSL modem to a distant DSL modem over a line;
in response to detecting a loss-of-signal event that causes a substantial stop to reception of DSL communications from the distant DSL modem, transmitting a substantially reduced average power to the line in a direction of the uplinking and monitoring the line to determine whether reception of DSL signals from the distant DSL modem has restarted; and
resuming the DSL communication session with the distant DSL modem in response to the monitoring determining that the reception of DSL signals from the distant DSL modem has restarted.

13. The method of claim 12, wherein the transmitting a substantially reduced average power includes transmitting to the line in a direction of the uplinking over a proper subset of DSL tones used to uplink the data during the maintaining.

14. The method of claim 12, wherein the transmitting a substantially reduced average power includes transmitting to the line over less than a third of a set of DSL tones used to uplink the data during the maintaining.

15. The method of claim 12, wherein the resuming is performed without re-measuring elements of a channel matrix for the DSL communication session.

16. The method of claim 12, further comprising participating in a procedure that determines a precoding matrix of a vectoring group that includes the local DSL modem.

17. The method of claim 12, further comprising, participating in a procedure that determines a decoding matrix for a vectoring group that includes the local DSL modem.

18. An apparatus, comprising:
a first set of centrally controlled DSL modems capable of maintaining a set of parallel DSL communication sessions with DSL modems of a second set via a set of lines;
wherein one of the centrally controlled DSL modems is configured to substantially reduce an average power transmitted to one of the lines in response to detecting a loss-of-signal event that causes a substantial stop of reception of DSL communications from one of the DSL modems of the second set via the one of the lines and is configured to monitor the one of the lines to determine whether reception of DSL communications from the one of the DSL modems of the second set has restarted; and
wherein the set of centrally controlled DSL modems is configured to resume the set of parallel DSL communication sessions in response to the restart of reception of DSL communications from the one of the DSL modems of the second set.

19. The apparatus of claim 18, wherein the one of the centrally controlled DSL modems is configured to substantially reduce the power by transmitting over less than a third of a set of DSL tones available to transmit data to the one of the DSL modems of the second set.

20. The apparatus of claim 18, wherein the one of the centrally controlled DSL modems is configured to resume the set of parallel DSL communication sessions by precoding data signals for DSL transmission with a matrix used to precode data signals prior to the substantial stop of reception of DSL communications from the one of the DSL modems of the second set.

21. The apparatus of claim 18, wherein the set of centrally controlled DSL modems is configured to resume the set of parallel DSL communication sessions by decoding received DSL data signals with a matrix used to decode received DSL data signals prior to the substantial stop of reception of DSL communications from the one of the DSL modems of the second set.

* * * * *